United States Patent
Mudge

(10) Patent No.: US 8,885,962 B1
(45) Date of Patent: Nov. 11, 2014

(54) REALTIME LONG RANGE IMAGING SCATTER REDUCTION

(71) Applicant: Lockheed Martin Corporation, Bethesda, MD (US)

(72) Inventor: Jason Dominic Mudge, Los Altos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 36 days.

(21) Appl. No.: 13/904,976

(22) Filed: May 29, 2013

Related U.S. Application Data

(60) Provisional application No. 61/674,793, filed on Jul. 23, 2012.

(51) Int. Cl.
*G06K 9/40* (2006.01)
*G06T 5/00* (2006.01)

(52) U.S. Cl.
CPC ...................................... *G06T 5/003* (2013.01)
USPC .......................................................... 382/254

(58) Field of Classification Search
USPC ............................ 382/254, 255, 274, 275, 312
See application file for complete search history.

(56) References Cited

U.S. PATENT DOCUMENTS

| | | | |
|---|---|---|---|
| 2010/0149533 A1* | 6/2010 | Fest | 356/367 |
| 2011/0043603 A1* | 2/2011 | Schechner et al. | 348/25 |
| 2012/0212477 A1* | 8/2012 | Grindstaff et al. | 345/419 |

* cited by examiner

*Primary Examiner* — Phuoc Tran
(74) *Attorney, Agent, or Firm* — McDermott Will & Emery LLP

(57) ABSTRACT

Aspects of the subject technology relate to methods and systems for removing haze from an input image. The system includes a polarimeter configured to receive an input image, the input image comprising haze corresponding to light scatter. The polarimeter is further configured to produce plural Stokes values based on received input image. The system also includes a signal processor coupled to the polarimeter. The signal processor is configured to determine a peak angle and a valley angle for the input image based on the plural Stokes values, where the peak angle corresponds to an angle at which the input image has the most amount of light scatter passing therethrough, and the valley angle corresponds to an angle at which the input image has the least amount of light scatter passing therethrough. The signal processor is further configured to perform removal of the haze from the input image based on the determined peak and valley angles.

20 Claims, 9 Drawing Sheets

REALTIME LONG RANGE IMAGING SCATTER REDUCTION

CROSS-REFERENCE TO RELATED APPLICATIONS

This application claims the benefit of priority under 35 U.S.C. §119 from U.S. Provisional Patent Application 61/674,793 filed Jul. 23, 2012, which is incorporated herein by reference in its entirety.

STATEMENT REGARDING FEDERALLY SPONSORED RESEARCH OR DEVELOPMENT

Not applicable.

FIELD

The present invention generally relates to imaging, and more particularly to realtime long range imaging scatter reduction.

BACKGROUND

In the world of remote sensing, there are different reasons for degraded image quality. For example, noise in the focal plane and/or electronics, less than perfect optical components and configurations, and poor atmospheric conditions are some issues in long range imaging of scenes and objects.

SUMMARY

The disclosed subject matter relates to a system for removing haze from an input image. The system comprises a polarimeter configured to receive an input image, the input image comprising haze corresponding to light scatter, and to produce plural Stokes values based on received input image. The system further comprises a signal processor coupled to the polarimeter, the signal processor configured to determine a peak angle and a valley angle for the input image based on the plural Stokes values, the peak angle corresponding to an angle at which the input image has the most amount of light scatter passing therethrough, and the valley angle corresponding to an angle at which the input image has the least amount of light scatter passing therethrough. The signal processor is further configured to perform removal of the haze from the input image based on the determined peak and valley angles.

The disclosed subject matter relates to a method for removing haze from an input image. The method comprises receiving plural Stokes values produced by a polarimeter based on an input image, the input image comprising haze corresponding to light scatter. The method further comprises determining a peak angle and a valley angle for the input image based on the plural Stokes values, the peak angle corresponding to an angle at which the input image has the most amount of light scatter passing therethrough, and the valley angle corresponding to an angle at which the input image has the least amount of light scatter passing therethrough. In addition, the method comprises performing removal of the haze from the input image based on the determined peak and valley angles.

The foregoing has outlined rather broadly the features of the present disclosure in order that the detailed description that follows can be better understood. Additional features and advantages of the disclosure will be described hereinafter. These and other advantages and features will become more apparent from the following description taken in conjunction with the drawings.

For a more complete understanding of the present disclosure, and the advantages thereof, reference is now made to the following descriptions to be taken in conjunction with the accompanying drawings describing specific aspects of the disclosure.

DETAILED DESCRIPTION

In some aspects of the present technology, methods and configurations used for realtime (or substantially realtime) reduction of long range imaging scatter effects are provided. In one aspect, imaging polarimetry technology may be used to collect a number of Stokes values (e.g., Stokes parameters). In an aspect, the realtime dehazing system disclosed herein may utilize the Stokes values to generate the required images for the dehazing algorithm in an automated manner (e.g., without human intervention), and to provide dehazed images of scenes and objects.

More particularly, the realtime dehazing system includes a polarimeter configured to receive an input image, the input image comprising haze corresponding to light scatter. The polarimeter is further configured to produce plural Stokes values based on received input image. The system also includes a signal processor coupled to the polarimeter. The signal processor is configured to determine a peak angle and a valley angle for the input image based on the plural Stokes values, where the peak angle corresponds to an angle at which the input image has the most amount of light scatter passing therethrough, and the valley angle corresponds to an angle at which the input image has the least amount of light scatter passing therethrough. The signal processor is further configured to perform removal of the haze from the input image based on the determined peak and valley angles.

Figure 1:
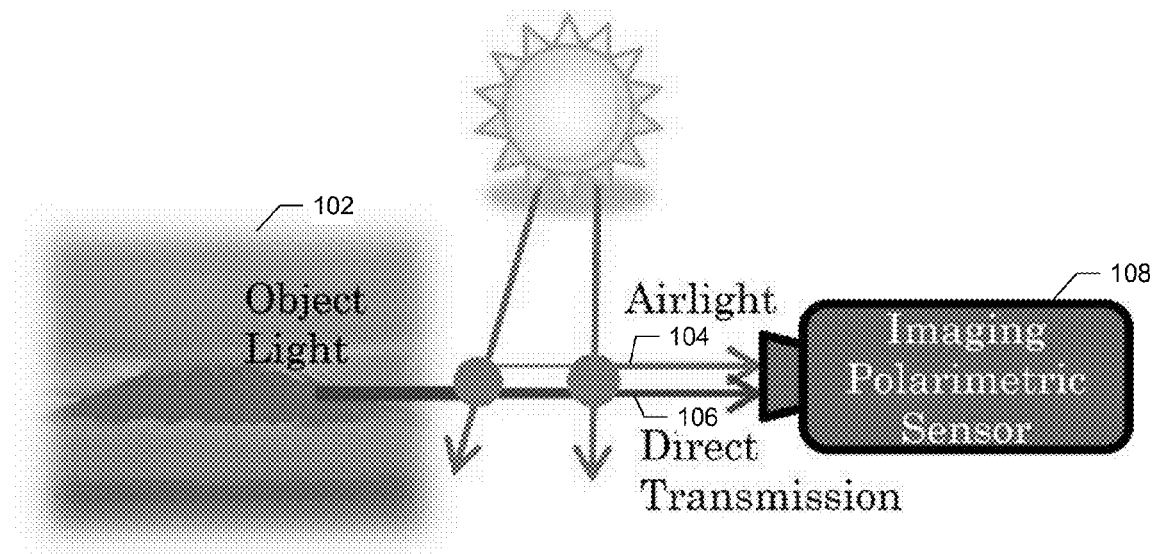
FIG. 1 is a conceptual diagram illustrating an example of light from an object being attenuated as it propagates to an imaging polarimeter.

FIG. 1 is a conceptual diagram illustrating an example of light from an object being attenuated as it propagates to an imaging polarimeter. FIG. 1 illustrates the sensing of object light 102 by an imaging polarimetric sensor 108. In addition to the direct transmission 106 of the object light 102, imaging polarimetric sensor 108 also captures airlight 104.

In this regard, a particular type of atmospheric image degradation, called light scatter, may arise from unwanted light (e.g., airlight 104) scattering off particles in a medium (e.g., air particles) and into the imaging light path (e.g., direct transmission 106) making its way to the imaging polarimetric sensor 108. This scattered light (e.g., airlight 104) does not emanate from the object of interest (e.g., object light 102) and can wash out the image of the object, therefore, resulting in reduction of image clarity. The effect is known as "haze."

Image degradation by haze can be significant when viewing over long horizontal distances, particularly in urban areas where there tend to be a substantial amount of airborne particulates (e.g., in water particles in fog or polluting particles in air pollution). The same type of image degradation may occur in other media such as water, when imaging is performed under water (e.g., underwater imaging).

There are a number of ways to mitigate the effects of haze from images. For example, a background image can be subtracted from an image, assuming an image (e.g., a background image) can be taken without the object in view. However, since scatter or haze is linearly polarized to some degree, physics based algorithms using polarimetric information may be used to improve quality of an image by "dehazing" the image. Inputs to a dehazing algorithm may be generated from an imaging polarimetric sensor.

The subject disclosure provides for a realtime dehazing system, which can provide for mitigating haze in an image, using polarimetric information in realtime (or substantially realtime), in an automated fashion. In an aspect, the subject technology may provide an improved solution relative to the traditional manual polarizer method by at least being automated (e.g., software based) and not requiring human intervention.

Figure 2:
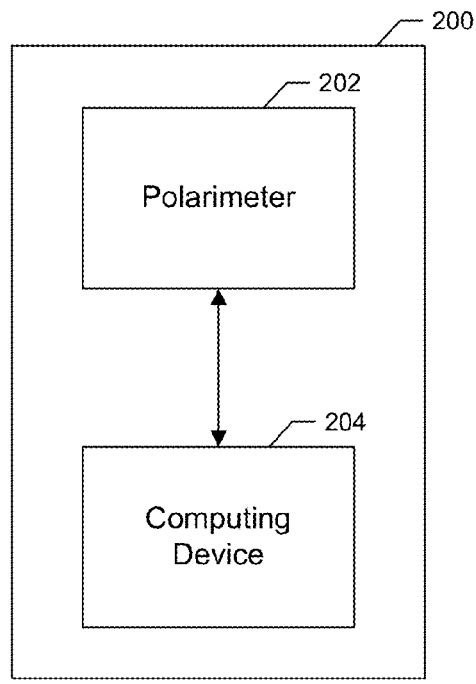
FIG. 2 is a block diagram of an example realtime dehazing system.

FIG. 2 is a conceptual diagram of an example realtime dehazing system. The realtime dehazing system 200 comprises an imaging polarimeter 202, e.g., a Stokes imaging polarimeter (hereinafter, "polarimeter") and a computing device 204. The polarimeter 202 includes a number of optical components, including, but not limited to, one or more lenses, one or more optical beam splitters, and one or more optical filters. In example aspects, the polarimeter 202 may be operable to receive an input image comprising haze, and simultaneously provide a number of Stokes values based on the input image, each of the Stokes values corresponding to different polarization. However, it should be noted that it is not necessary for the polarimeter 202 to provide the Stokes values simultaneously. In example aspects, the polarimeter 202 can provide one or more Stokes values in a substantially simultaneous manner, or at different times.

The computing device 204 comprises one or more processors configured to execute an algorithm that can provide a dehazed image, based on the Stokes values provided by the polarimeter 202. In doing so, the computing device 204 determines a peak angle and a valley angle for the input image based on the Stokes values, where the peak angle corresponds to an angle at which the input image has the most amount of light scatter passing therethrough, and the valley angle corresponds to an angle at which the input image has the least amount of light scatter passing therethrough. The computing device 204 performs removal of the haze from the input image based on the determined peak and valley angles. In example aspects, the computing device 204 may include a personal computer or a handheld device, such as a laptop computer, a tablet, a smart phone, a personal digital assistant (PDA), etc.

To produce a dehazed image in realtime, an imaging polarimeter (e.g., polarimeter 202) which generates the Stokes values in realtime with reasonable accuracy can be employed. In this regard, U.S. patent application Ser. No. 12/771,635, the contents of which are incorporated by reference herein in its entirety, describes an example of such an imaging polarimeter (hereinafter, "the '635 polarimeter"), which is incorporated by reference herein in its entirety. In example aspects, the '635 polarimeter includes a number of optical components, including, but not limited to one or more lenses, one or more optical beam splitter, and one or more optical filters, which are configured to collect a number of channels (e.g., 4 channels) in one snapshot.

In example aspects, the '635 polarimeter provides the complete set of Stokes values simultaneously (e.g., as one "snap shot") with errors on the order of 2%-3%. This error value is calculated based on an input of completely polarized light which implies the polarization errors are 0.02-0.03. The polarization of the airlight can be expected to be approximately 0.30-0.40. This is an error of approximately 2 parts in 30, which can be acceptable to polarimetrically dehaze an image. Additionally, durability of the imaging polarimeter can be necessary to dehaze an image in the field where the technology is useful.

The '635 polarimeter can perform well in a multitude of outdoor environments, and the low size, weight, and power give ease in portability as a field unit. All of these attributes make this imaging polarimeter well suited for use in realtime imaging according to the subject disclosure through haze in the field. However, the image dehazing technique of the subject disclosure is not limited to the use of the '635 polarimeter in particular. Rather, the image dehazing technique can be employed using any (or virtually any) imaging polarimeter which provides the first three Stokes values. In example aspects, the fourth and last values which describe the amount of left or right circular polarization are not necessary. Further, the employed imaging polarimeter can be a field portable unit with similar or less accuracy errors then those mentioned above.

In conjunction with this imaging polarimeter, realtime dehazing algorithms according to the subject disclosure use the imaging polarimeter Stokes values to provide an image with haze removed. However, before discussion of such realtime dehazing algorithms, a description of a different, non-realtime technique (hereinafter, "technique A") will be provided. With reference to technique A, the dehazed image can be represented by the following:

$$\tilde{r} = \frac{\tilde{i} - \tilde{a}}{e^{-\tilde{\beta}\tilde{z}}} \qquad \text{Equation (1)}$$

where $\tilde{i}$ is the hazed intensity image, $\tilde{a} = (\tilde{i}^{\perp} - \tilde{i}^{\parallel})/\tilde{p}$ is referred to as the airlight, the image is attenuated by the transmittance $t(\tilde{z}) = e^{-\tilde{\beta}\tilde{z}}$ which is the ratio of the light arriving at the sensor from the object, (e.g., direct transmission) to the light emanating from the object, $\tilde{p}$ is the degree of (e.g., linear) polarization of the airlight, $\beta$ is the scattering coefficient, and $\tilde{z}$ is the distance to the object. The tilde implies these are estimates (or measurements) obtained by the imaging polarimeter. To develop Equation (1), several assumptions are put in place for technique A: (1) light emitted from the object is absorbed or scattered in all directions by particles in the path, (2) direct transmission is relatively unpolarized, and (3) a single-scatter effect applies. It is the last two assumptions (e.g., (2) and (3)) which allow the object light to be decoupled from the airlight.

It should be noted that the derivation does not necessarily require knowledge of the scattering mechanism, but simply that it be partially (e.g., linearly) polarized in a particular orientation. The physical interpretation of Equation (1) is: (1) the numerator removes the airlight by subtracting $\tilde{a}$ from $\tilde{i}$, and (2) the denominator undoes the absorption or scatter of light emanating from the object by dividing by $\tilde{z}^{-\beta \tilde{z}}$. These are done on a local pixel by pixel level.

An additional assumption can be made that the scattering coefficient is not a function of distance, e.g., homogenous, gives a transmittance value of $\tilde{z}^{-\beta \tilde{z}}$. It is recognized with technique A that transmittance can be estimated by examining an object within the scene that has approximately zero transmittance to that of other objects in the scene, and done so without the assumption that the scattering coefficient does not vary with object distance. Technique A can provide for a transmittance of $$\tilde{t}(\tilde{z}) = 1 - \frac{\tilde{a}}{\tilde{a}_\infty} \quad \text{Equation (2)}$$

where $\tilde{a}_\infty$ is the airlight from an object at an infinite distance which has no transmittance. Recognizing that transmittance is a function of object distance, technique A obtains a range estimation of scene objects passively. In order to dehaze a scene using Equation (1), the transmittance must be first calculated. Therefore, if a scene can be dehazed in realtime, then an estimate of range can also be had in realtime.

Substituting in the airlight and transmittance values into Equation (1), a form for the imaging polarimeter's output is:

$$\tilde{r} = \frac{\tilde{i} - (\tilde{i}^\perp - \tilde{i}^\parallel)/\tilde{p}}{1 - (\tilde{i}^\perp - \tilde{i}^\parallel)/\tilde{p}\tilde{a}_\infty} \quad \text{Equation (3)}$$

The method that technique A uses to obtain images $\tilde{i}^\perp$ and $\tilde{i}^\parallel$ is to manually rotate the polarizer in front of the detector and search for the "best" and "worst" state angles. The worst state angle or peak angle is the angle where the image has the most scatter passing through, and the valley angle is the angle where the image has the least amount of scatter passing or best state angle. Technique A can subsequently take an image at each of those two angles which are $\tilde{i}^\perp$ and $\tilde{i}^\parallel$.

Figure 3:
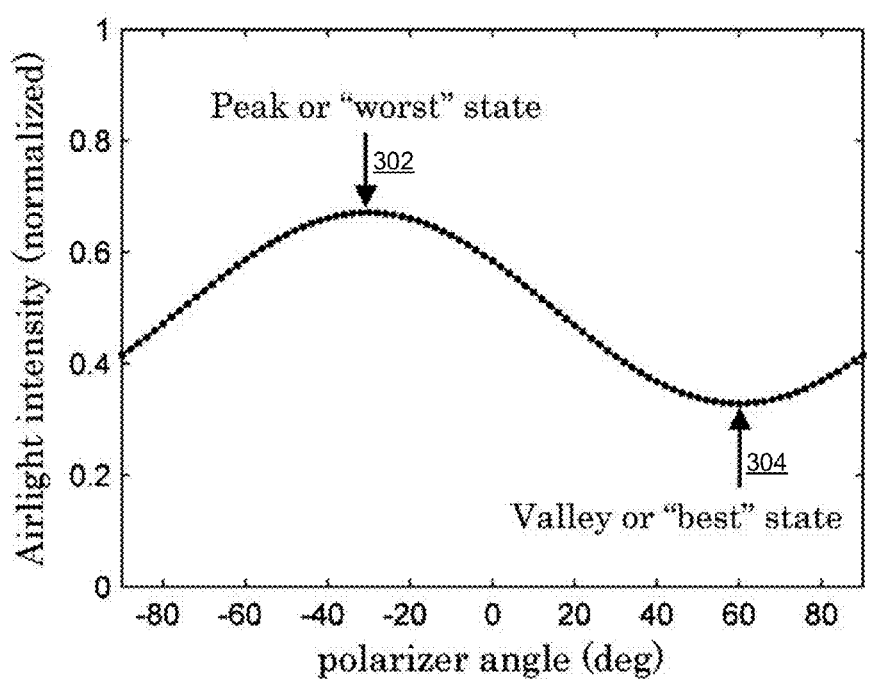
FIG. 3 is a graph illustrating an example of airlight peak and valley angles.

FIG. 3 is a graph illustrating an example of airlight peak and valley angles. In accordance with the subject technology (e.g., using a polarimeter such as the '635 polarimeter), the images $\tilde{i}^\perp$ and $\tilde{i}^\parallel$ can be generated in an automated manner in one and every snap shot in realtime. As described herein, two different methods (hereinafter, "technique B" and "technique C") can be used to generate the images $\tilde{i}^\perp$ and $\tilde{i}^\parallel$ in such an automatic manner.

The method of technique B is to multiply the Stokes values (e.g., formed in a vector) provided from the imaging polarimeter by a rotated polarizer Mueller matrix in software. The airlight intensity value, after passing through this "software ideal rotated polarizer" for many polarizer angles, is plotted verses polarizer angle, as shown in the example of FIG. 3. The peak angle 302 and valley angle 304 are used in the software ideal rotated polarizer (e.g., applied globally) to obtain $\tilde{i}^\perp$ and $\tilde{i}^\parallel$ images, respectively. Thus, the plot illustrated in FIG. 3 describes the behavior of the airlight intensity verses the polarizer angle to determine the peak and valley angles.

However, in accordance with technique C, Equations (4) and (5) can directly identify the peak polarizer angle, $\theta_{peak}$, as follows:

$$\theta_{peak} = -\frac{1}{2}\tan^{-1}\left(-\frac{s_2}{s_1}\right) \text{ for } s_1 \geq 0 \quad \text{Equation (4)}$$

$$\theta_{peak} = \frac{\pi}{2} - \frac{1}{2}\tan^{-1}\left(-\frac{s_2}{s_1}\right) \text{ for } s_1 < 0 \quad \text{Equation (5)}$$

In Equations (4) and (5), $s_1$ and $s_2$ are the second and third Stokes values of the airlight provided by the imaging polarimeter (e.g., polarimeter 202). The angle $\theta_{peak}$ represents the relative orientation of light scatter to the imaging polarimeter and is determined for each snap shot (e.g., to dehaze on a platform in motion). The valley angle, $\theta_{valley}$, is also determined in realtime as follows:

$$\theta_{valley} = \theta_{peak} + \frac{\pi}{2}. \quad \text{Equation (6)}$$

For technique A, determining $\tilde{i}^\perp$ and $\tilde{i}^\parallel$ is a manual operation requiring two images taken in succession. Because of the manual operation, applications on a platform in motion or realtime applications are not as feasible. However, utilizing either technique B or C with a realtime imaging polarimeter (e.g., the '635 polarimeter), such applications on a platform in motion or realtime become more feasible.

Technique A determines the hazed intensity image ti by summing $\tilde{i}^\perp$ and $\tilde{i}^\parallel$ which are taken in succession. Alternatively, the realtime imaging polarimeter of the subject disclosure provides $\tilde{i}$ as the first Stokes value ($s_0$) which is directly inserted into the algorithm reducing computational time.

In accordance with example aspects, to complete image haze removal, the global (scalar) values of $\tilde{p}$ and $\tilde{a}_\infty$ shown in Equation (3) should be defined. If a full inversion is performed where $\tilde{p}$ is set to exactly the linear polarization of the airlight, there can be undesired amplification of noise. To reduce such noise amplification, the value of $\tilde{p}$ is increased.

Technique A can increase $\tilde{p}$ by a factor of 1.09 for images. However, for techniques B and C, $\tilde{p}$ can be increased by a factor of 1.5. The increase is attributed to a relatively noisy focal plane. Additionally, the value of $\tilde{a}_\infty$ can also be increased by a factor of 1.5 of the horizon value in the image for similar reasons. It should be noted that further tuning of these global values can provide an improved dehazed image that would not only depend on the scene, but also depend on the sensor noise characteristics and possibly even the system waveband. Additionally, when varying the two parameters by up to 10%, there is little change in the performance of the dehazing algorithms (e.g., techniques B or C).

Having calculated the peak and valley polarizer angles, the respective images are inserted into Equation (3) along with the hazed intensity image and the two global values previously discussed. As such, image haze removal is considered complete.

Figure 4A:
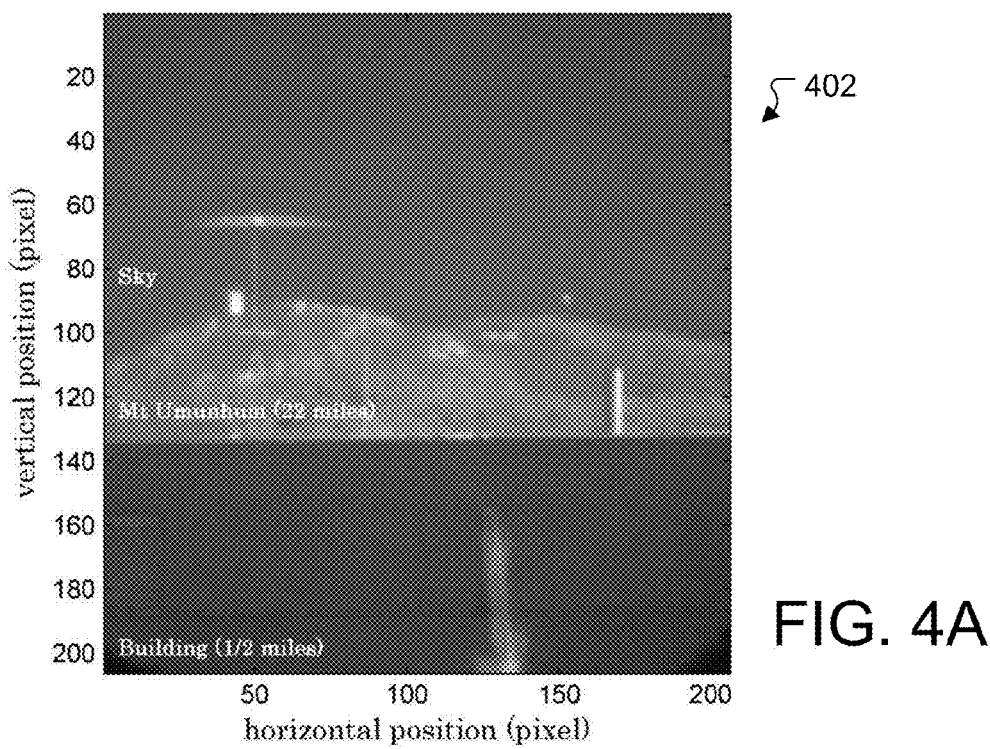
FIGS. 4A and 4B illustrate an example of dehazing performed by the dehazing system of FIG. 1.
Figure 4B:
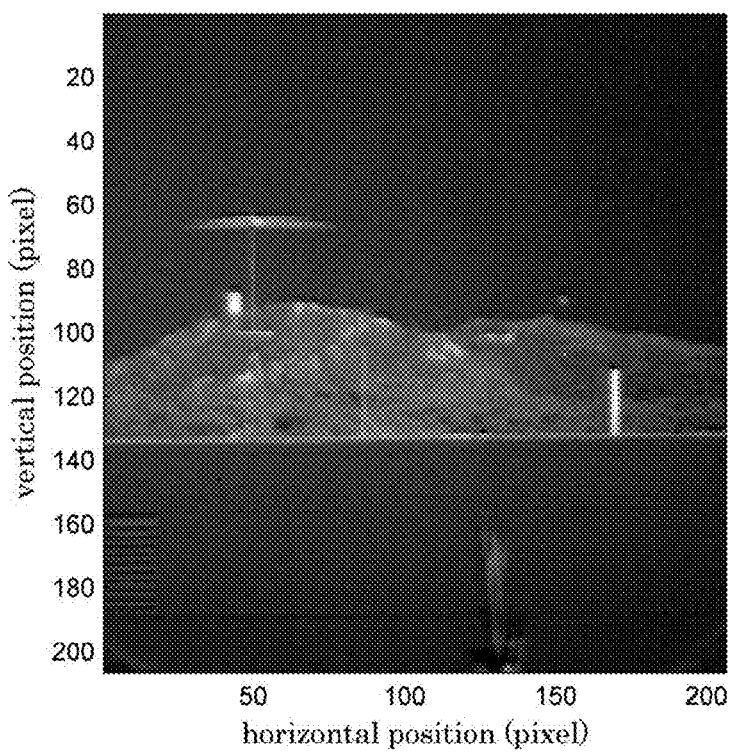

FIGS. 4A and 4B illustrate an example of dehazing performed by the dehazing system of FIG. 1. In the example of FIGS. 4A and 4B, the '635 polarimeter imaged a decommissioned Air Force Base (682nd) seven-story radar tower atop Mount Umunhum (e.g., with elevation of 3486 ft.) in the San Francisco Bay Area, California from a distance of approximately 22 miles. The hazed image 402 provided by the polarimeter is shown in FIG. 4A. FIG. 4B shows a dehazed image 404 generated by Equation (3) in conjunction with the subject dehazing algorithm (e.g., technique B or C).

Figure 5:
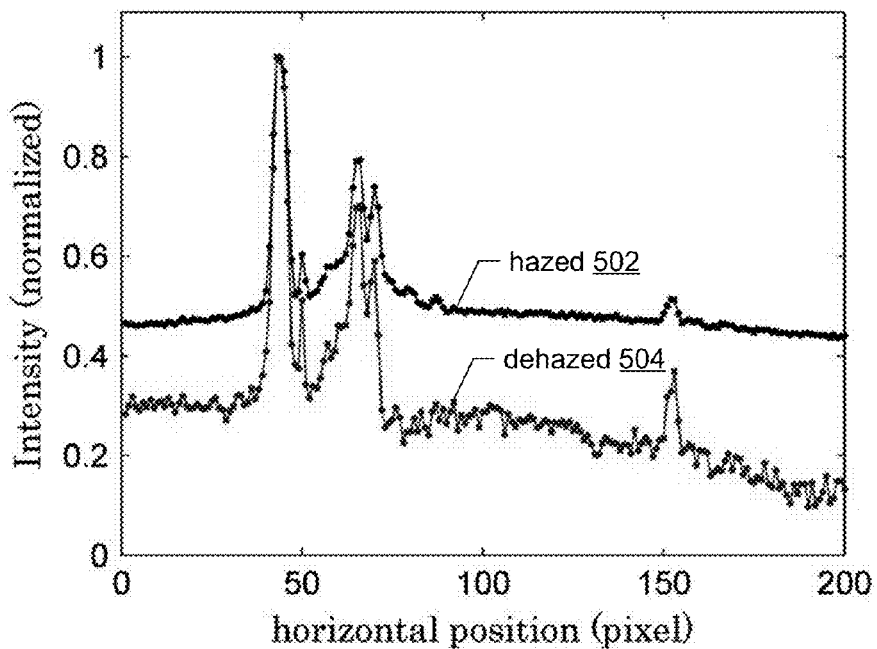
FIG. 5 illustrates an example plot line at the vertical position of a preset pixel for the hazed and dehazed images of FIGS. 4A and 4B.

FIG. 5 illustrates an example plot line at the vertical position of a preset pixel for the hazed and dehazed images of FIGS. 4A and 4B. In the dehazed image 404, the mountain side is crisper as is the building vent in the foreground on the lower left hand side. The building is at a distance of approximately ½ mile. As a first attempt to quantify the improved clarity, a horizontal line plot (e.g., lines 502 and 504) is generated by plotting the intensity value verses the horizontal position at a given vertical position. For example, choosing the vertical position pixel 91 (see FIGS. 4A and 4B), a horizontal line passes through the decommissioned radar tower (bright rectangular spot on top of the mountain on the left) and sky for the hazed and dehazed image. This provides a strong signal and a dark background since the sky signal in the near-infrared is minimal (e.g., ideal for comparing relative contrast ratios). The improvement is shown in the normalized line plot (e.g., lines 502 and 504) in FIG. 5. The contrast ratio minimum increase is estimated at 50% for this particular part of the image. As an example, there is a NexRad weather radar (Next-Generation Radar) which is effectively a 20 ft. diameter sphere perched on Mount Umunhum. This is shown by the intensity bump at horizontal position pixel 152. The intensity bump is real and shows nearly two times improvement in a relative contrast ratio between the dehazed and hazed images.

The horizontal line plot of FIG. 5 is an attempt at quantifying the improvement provided by the subject dehazing algorithm. Two extreme scenarios can be considered when imaging through haze: (1) an image taken in very close proximity to the object, and (2) an image taken infinitely far away from the object. For the first, haze will not have much of an effect on an image's spatial frequencies. However, in the second scenario, haze may prevent any recognition of the object on the image, and haze alone is expected to have relatively low spatial frequencies. Between these two extremes, an image of an object that has some haze will have some higher spatial frequencies penetrating the haze but be significantly attenuated. Therefore, examining the power spectral density (PSD) of the hazed image versus the dehazed image can provide a more general quantitative assessment on the dehazing algorithm's performance when imaging through haze, assuming the object has broad spectrum spatial frequencies as is the case for this sample image.

Figure 6:
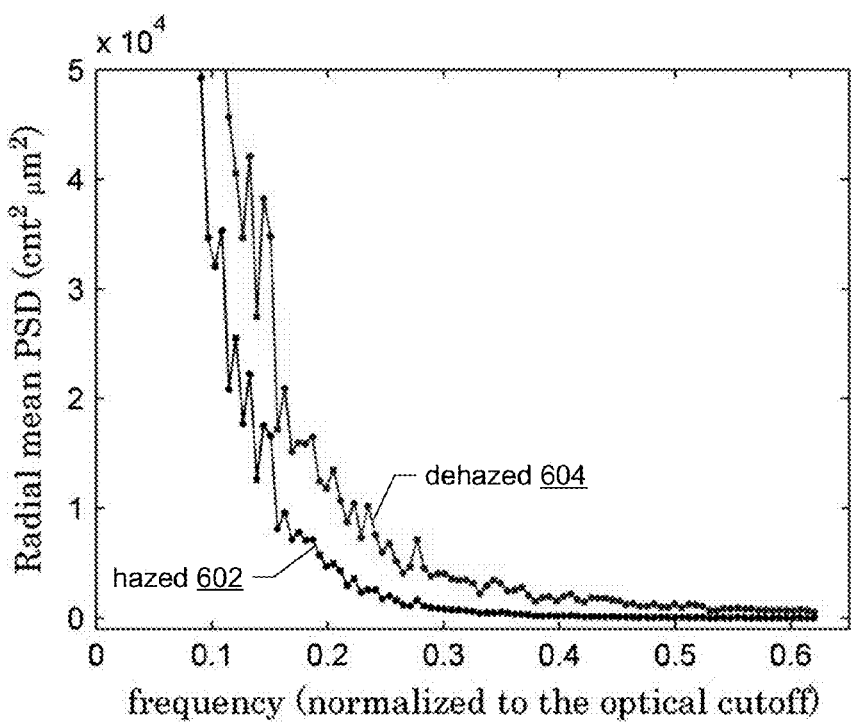
FIG. 6 illustrates an example plot line of the radial mean power spectral density (PSD) versus spatial frequency normalized to the imaging polarimeter's optical cutoff frequency, for the hazed and dehazed images of FIGS. 4A and 4B.

FIG. 6 illustrates an example plot line of the radial mean PSD versus spatial frequency normalized to the imaging polarimeter's optical cutoff frequency, for the hazed and dehazed images of FIGS. 4A and 4B. For example, with reference to the imaging polarimeter's optical cutoff frequency, the optical system's $f$-number is 20 and operating wavelength 1.55 μm. The radial mean is the average value for a given radius (e.g., in frequency) from the center of the PSD image. Using a radial mean PSD can provide a more accurate and less selective relative estimate of the PSD value at a particular frequency for the imaging system. As shown by lines 602 and 604, FIG. 6 indicates that after the haze has been removed, the PSD values are, in general, significantly higher than the original hazed image. It should be noted that the optical cutoff frequency remains unchanged during the dehazing process, as shown in FIG. 6.

In example aspects, a consideration can be made for the building vent in the foreground on the lower left hand side of the image (see FIGS. 4A and 4B) which has a normalized frequency of approximately 0.39 in the vertical direction. In the hazed image, the radial mean PSD value at this frequency is approximately 220 counts$^2$·μm$^2$. However, in the dehazed image, the value is significantly higher at approximately 2000 counts$^2$·μm$^2$. Thus, the dehazing algorithm increased the PSD value by a factor of 9.5 at a frequency that is within optical system's cutoff frequency. This is an example for the reason the building vent appears crisper in the dehazed image relative to the hazed image in FIGS. 4A and 4B.

Figure 7:
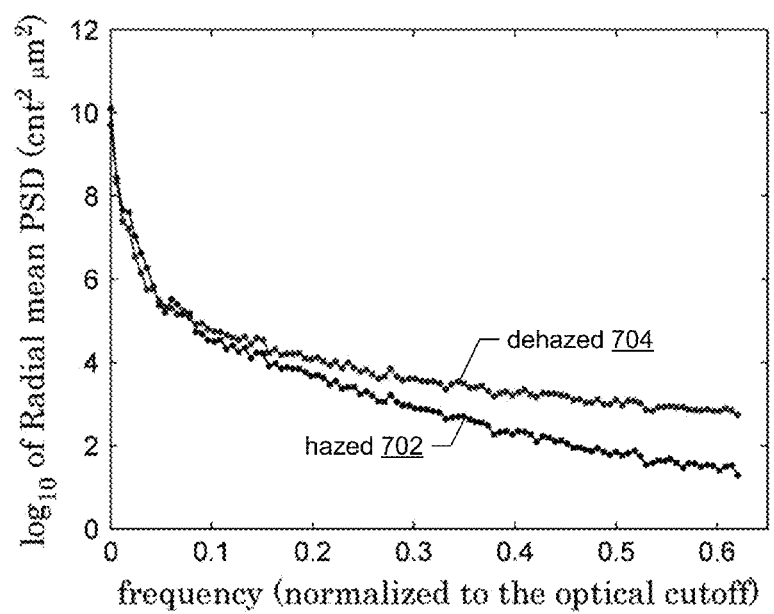
FIG. 7 illustrates an example plot line of a logarithm base 10 for the radial mean PSD of the hazed and dehazed images of FIGS. 4A and 4B.

FIG. 7 illustrates an example plot line of a logarithm base 10 for the radial mean PSD of the hazed and dehazed images of FIGS. 4A and 4B. FIG. 7 illustrates the improvement in the image's higher frequencies with hazed removed. In addition, lines 702 and 704 show at some of the very low frequencies that the dehazed image has a slightly lower PSD value than the hazed image. This can be attributed to the dehazed image having the low frequency haze components removed, and thus lowering the PSD values at those lower frequencies. In example aspects, these results are consistent with other images of Mount Umunhum taken during the same acquisition period.

Figure 8A:
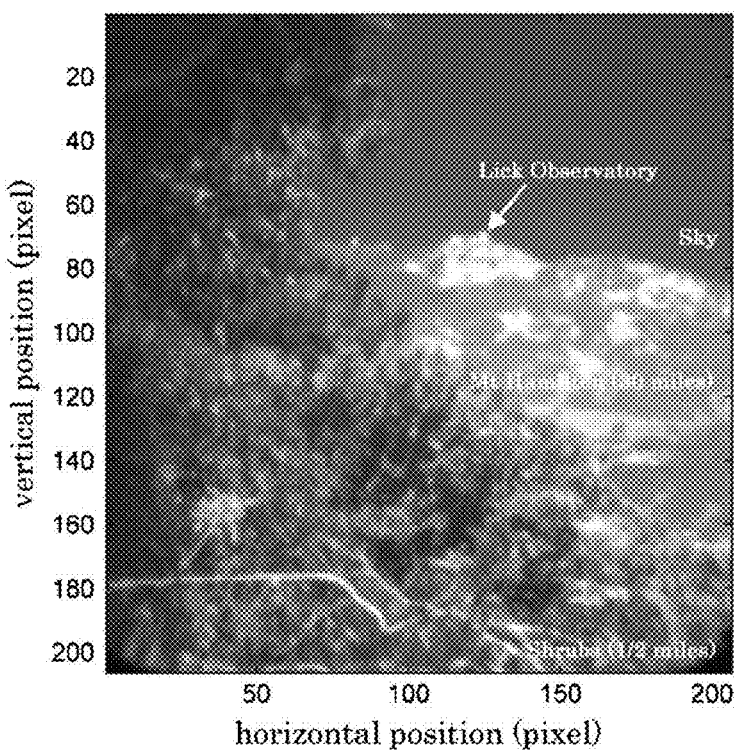
FIGS. 8A and 8B illustrate another example of dehazing performed by the dehazing system of FIG. 1.
Figure 8B:
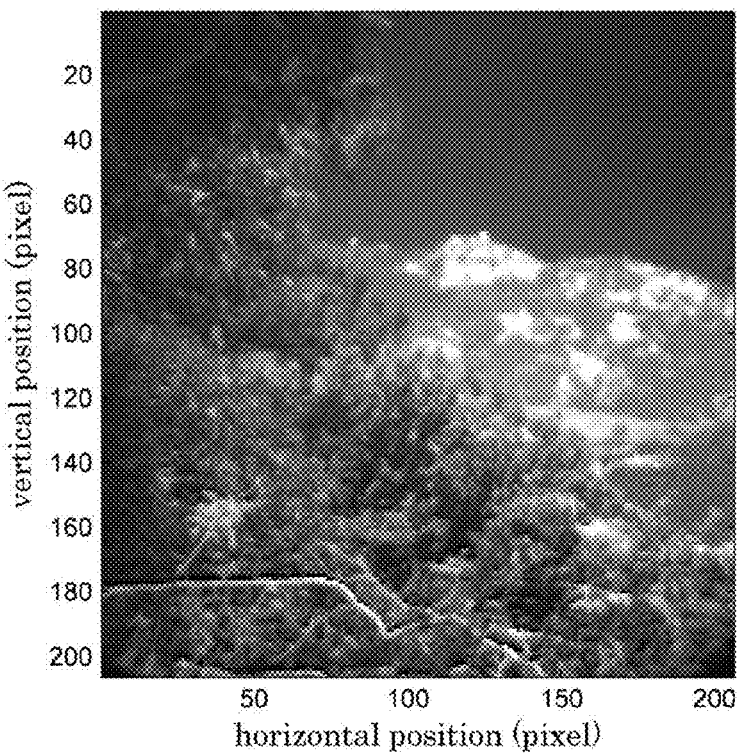

FIGS. 8A and 8B illustrate another example of dehazing performed by the dehazing system of FIG. 1. During the same data acquisition period as the first sample image acquisition, the imaging polarimeter (e.g., the '635 polarimeter) was rotated by approximately 45 degrees to view the Lick observatory, which stands on top of Mount Hamilton. The distance to and elevation of the Lick observatory is approximately 30 miles and 4200 ft., respectively. This results in a difference in the scatter orientation relative to the imaging polarimeter and a larger elevation change of nearly 1000 ft. The hazed image 802 provided by the polarimeter is shown in FIG. 8A, and FIG. 8B shows a dehazed image 804 generated by Equation (3) (e.g., in conjunction with technique B or C).

Figure 9:
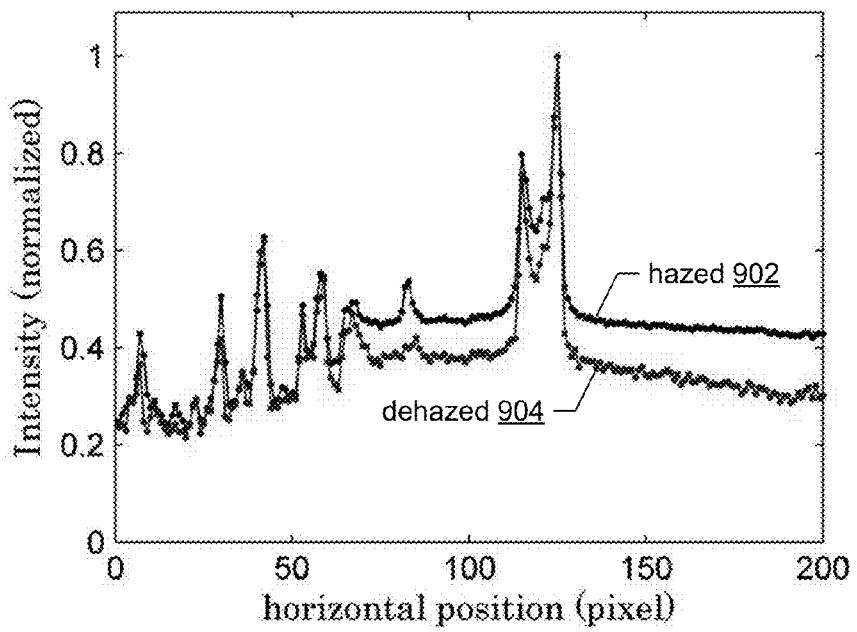
FIG. 9 illustrates an example plot line at the vertical position of a preset pixel for the hazed and dehazed images of FIGS. 8A and 8B.

FIG. 9 illustrates an example plot line at the vertical position of a preset pixel for the hazed and dehazed images of FIGS. 8A and 8B. For example, as a selective measure of performance for this image, a horizontal line plot (e.g., lines 902 and 904) is provided using a new vertical position pixel 70 which passes through one of the Lick observatory's domes. As can be seen in FIG. 9, this provides a strong signal and a dark background for a contrast ratio comparison. Lines 902 and 904 show similar results to the first sample image (e.g., 402 and 404). The contrast ratio minimum increase is estimated at 25% for this part of the image, as is the case for the first sample image (e.g., FIGS. 4A and 4B).

Figure 10:
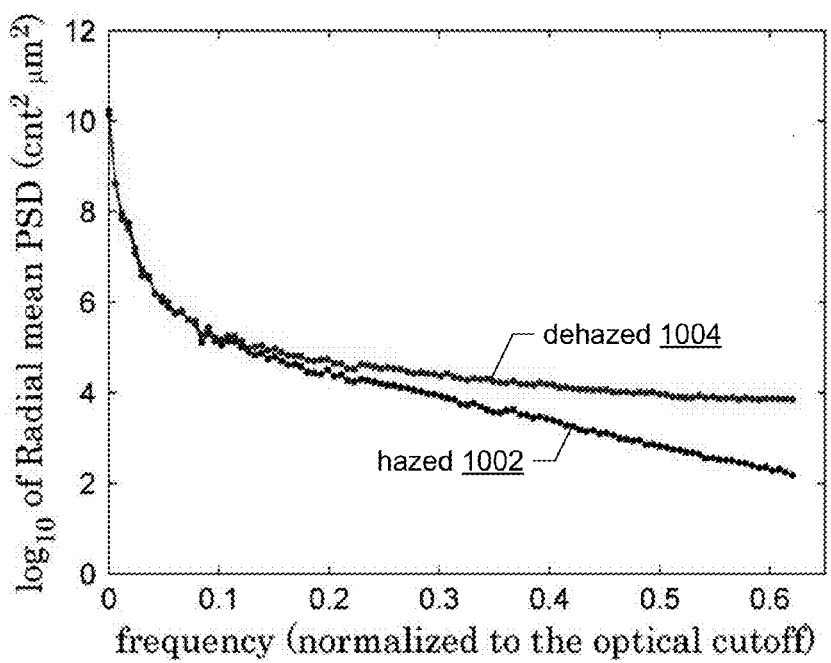
FIG. 10 illustrates an example plot line of a logarithm base 10 for the radial mean PSD of the hazed and dehazed images of FIGS. 8A and 8B.

FIG. 10 illustrates an example plot line of a logarithm base 10 for the radial mean PSD of the hazed and dehazed images of FIGS. 8A and 8B. Using the more general quantitative assessment of the performance for this scene, lines 1002 and 1004 of FIG. 10 illustrate values that are consistent with the first sample image.

While the second sample image (e.g., FIGS. 8A and 8B) is improved, the improvement is not as significant as the performance that for the first sample image (e.g., FIGS. 4A and 4B). Possible causes of this is the difference in the viewing angle relative to the sun (e.g., illumination source), the airlight having sufficiently dissimilar scatter properties in the viewing direction, and/or increased elevation change.

Regarding processing rates, with the Stokes values available, the subject dehazing algorithm run time is 0.0096 s using MATLAB on a computer with a processing speed of 2.2 GHz or 5.44×10$^6$ FLOPs. This includes performing the automated method to obtain the "best" and "worst" states for each snap shot. The full 12 bit image is 640 pixels×512 pixels with a pixel pitch of 25 μm. As described in U.S. patent application Ser. No. 12/771,635, the full image contains four subimages of differing polarization states, and each subimage is 205 pixels×205 pixels. FIG. 4A is the intensity image which is the (registered) sum of the four subimages and is 205 pixels×205 pixels. The processing time will scale as the number of pixels in the full image and/or subimages varies for a given imaging polarimeter. The prototype imaging polarimeter combined with the automated dehazing algorithm can provide a dehazed image in 0.268 s (143×10$^6$ FLOPs or 3.74 Hz) and for a (dedicated) custom product, it is estimated at 0.0354 s (28.2 Hz).

Accordingly, as a result of the subject dehazing algorithm (e.g., technique B or C), the trade space for the operational waveband can be expanded and reviewed when designing an imaging system. A designer can consider a waveband that is matched to the object being imaged and not necessarily be restricted by scatter effects of the medium in which the light propagates. This can allow for a reexamination of spectral blind spots caused by haze effects.

Polarimeter errors may affect the ability to remove haze and provide improved image quality. The '635 polarimeter has sufficiently low errors to dehaze an image which are stated as approximately 2 parts in 30, or 6%, for airlight polarization of 0.30-0.40. As a counter example, additional bias errors can be applied globally to the second and third Stokes value images of the sample data. It can be shown that significant image degradation occurs in the dehazed image when the Stokes value errors are on the order of 20% or more. If the airlight polarization is on the order of 0.10 (e.g., a low haze day), then this instrument error is approximately 0.02 parts in 0.10 or 20%. Therefore, the instrument would not necessarily be accurate enough to dehaze an image on such a clear day in its current state. However, since the day is clear and lacks significant haze, most likely the scene would not benefit much from this dehazing technology, even if a more accurate imaging polarimeter is employed.

Further, there are multiple types of image processing algorithms to improve and/or boost signals within an image which do not necessarily use polarization information. For example, Weiner filtering, contrast stretching, and tonal enhancement can be used. Contrast stretching and tonal enhancement can be performed on the hazed image as another gauge of the performance of the subject dehazing technology. While contrast stretching and tonal enhancement can show some improvement to the image, they may fail to remove the haziness in the image. Contrast stretching may boost the PSD values, but not to the same level as the dehazed image.

Using the building vent example in the first sample image (e.g., FIGS. 4A and 4B), the contrast stretched PSD value is 900 counts$^2$·μm$^2$ at a normalized frequency of 0.39, which is approximately four times higher than the hazed image but less than half (or ½.2) of the polarization based dehazing algorithm value. Again, while contrast stretching and tonal enhancement techniques have increased the PSD value, they may not remove the haziness in the image. Both image processing algorithms can boost the PSD values while on the other hand, the dehazing algorithm can increase the PSD value as well as remove the haze. These are two fundamentally different techniques. For the horizontal line plot example described above, neither contrast stretching nor tonal enhancement may significantly improve the intensity bump caused by the NexRad weather radar in the first sample image (e.g., see FIG. 5). The ratio of the peak intensity of the bump to the sky in the vicinity of the bump is 1.10 for the hazed image, and for contrast stretching and tonal enhancement the image can be improved slightly to 1.11 for both, but to 1.80 for the dehazed image. The ratio for the dehazed image between a real object in the sky can be significantly better than the contrast stretching and tonal enhancement. However, further integration of the subject dehazing algorithm to existing image processing algorithms is possible (e.g., particularly with Weiner filtering, which typically boosts the higher spatial frequencies). Also, since removing the haze may be fundamentally different than any of the above or other image processing algorithms, using them in conjunction with the polarization based dehazing algorithm can provide an even more improved image.

Additionally, the average value for the airlight degree of (linear) polarization is approximately 0.32 and 0.29 for the first sample image (e.g., FIGS. 4A and 4B) and second sample image (e.g., FIGS. 8A and 8B), respectively, at a wavelength of 1.55 μm with a band pass of 142 nm for our sample dehazing. Technique A can report 0.28, 0.25, and 0.22 for red, green, and blue visible wavebands, respectively. Recognizing that there were different conditions during each of these experiments, e.g., sun to sensor angle, aerosols, etc., the values for the subject dehazing algorithm (e.g., technique B or C) are consistent with those for technique A.

Thus, the subject disclosure provides for a system comprised of a realtime imaging polarimeter and an automated polarization based algorithm which can produce hazed-reduced imagery for instant applications. Using such a system, it is possible to dehaze an image for visual display providing on-the-spot detection or imbedding in an active control loop to improve viewing and tracking while on a moving platform (e.g., air platform, ground telescope, or submarine).

In some aspects, the subject technology is related to passive space satellite imagery through hazy conditions, deep water mining in cloudy waters, underwater surveying for shipping lanes, dehazing opening scenes such as mountains side as used in movie industry, medical imaging (e.g., looking through murky fluids and/or image just below skin), long range traffic imaging cameras (e.g., where distance is restricted by urban smog and pollution), licensing technology, smartphone dehazing applications (e.g., snap polarizing optics in front of the camera and click on the dehazing application to dehaze images in realtime). In some aspects, the subject technology may be used in various markets, including for example and without limitation, advanced sensors, advanced software, and photonics and optical computing markets.

Figure 11:
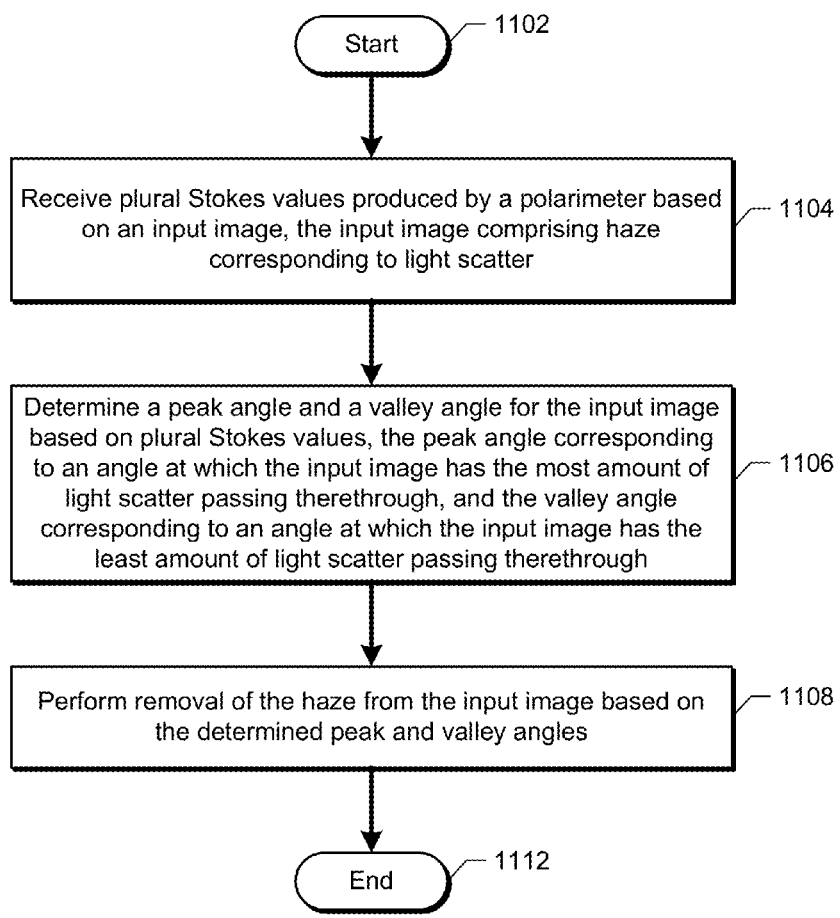
FIG. 11 illustrates an example process by which haze is removed from an input image.

FIG. 11 illustrates an example process by which haze is removed from an input image. Following start block 1102, plural Stokes values are received at step 1104. The plural Stokes values are produced by a polarimeter based on an input image, the input image comprising haze corresponding to light scatter. For example, the polarimeter can be configured to receive the input image and to produce plural Stokes values (e.g., in realtime) based on received input image.

At step 1106, a peak angle and a valley angle are determined for the input image based on the plural Stokes values. The peak angle corresponds to an angle at which the input image has the most amount of light scatter passing therethrough, and the valley angle corresponds to an angle at which the input image has the least amount of light scatter passing therethrough. The plural Stokes values can comprise first, second and third Stokes values.

In example aspects, determining the peak angle, $\theta_{peak}$, is based on the formulas:

$$\theta_{peak} = -\frac{1}{2}\tan^{-1}\left(-\frac{s_2}{s_1}\right) \text{ for } s_1 \geq 0 \qquad \text{Equation (4)}$$

$$\theta_{peak} = \frac{\pi}{2} - \frac{1}{2}\tan^{-1}\left(-\frac{s_2}{s_1}\right) \text{ for } s_1 < 0 \qquad \text{Equation (5)}$$

wherein $s_1$ and $s_2$ correspond to second and third Stokes values, respectively. In addition, determining the valley angle, $\theta_{valley}$, is based on the formula:

$$\theta_{valley} = \theta_{peak} + \frac{\pi}{2}. \qquad \text{Equation (6)}$$

In other example aspects, determining the peak angle and the valley angle can be based on a rotated polarizer Mueller matrix. Determining the peak angle and the valley angle can include multiplying the plural Stokes values by the rotated polarizer Mueller matrix in software, to generate plural airlight intensity values, plotting a graph of the plural airlight intensity values against respective polarizer angles corresponding to the rotated polarizer Mueller matrix, and selecting the peak angle and the valley angle based on the plotted graph.

At step 1108, removal of the haze from the input image is performed based on the determined peak and valley angles. In example aspects, removal of the haze is based on the formula:

$$\tilde{r} = \frac{\tilde{i} - (\tilde{i}^{\perp} - \tilde{i}^{\parallel})/\tilde{p}}{1 - (\tilde{i}^{\perp} - \tilde{i}^{\parallel})/\tilde{p}\tilde{a}_{\infty}} \qquad \text{Equation (3)}$$

where $\tilde{i}$ represents the input image with haze, $\tilde{r}$ represents the input image with removal of the haze, $\tilde{i}^{\perp}$ represents a version of the input image at the peak angle, $\tilde{i}^{\parallel}$ represents an input image corresponding to the valley angle, $\tilde{p}$ represents a degree of linear polarization of the airlight, and $\tilde{a}_{\infty}$ represents an amount of airlight from an object at an infinite distance with no transmittance. In addition, $\tilde{p}$ and/or $\tilde{a}_{\infty}$ can be increased by a present factor for the calculation of $\tilde{r}$. The process then ends at end block 1112.

Figure 12:
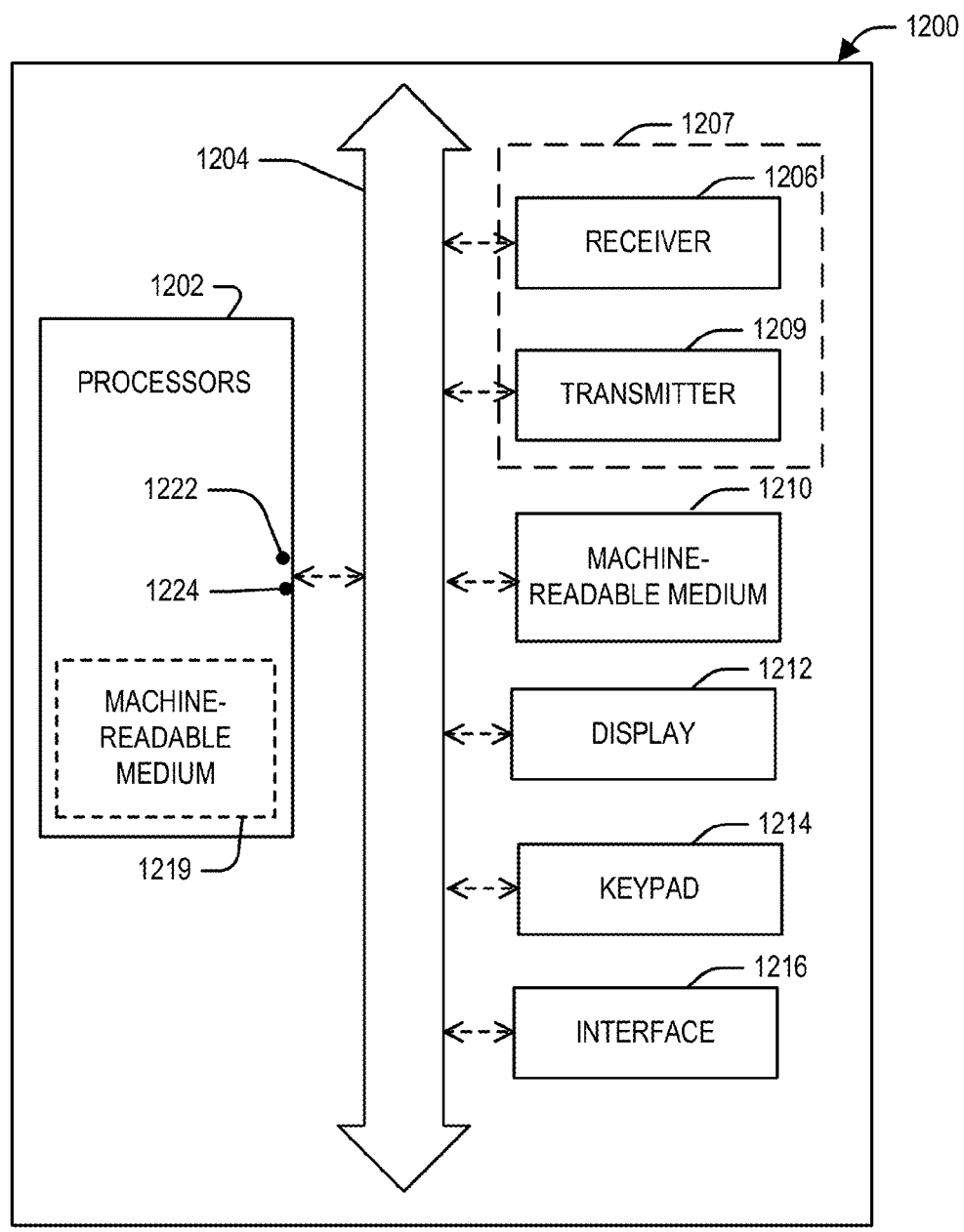
FIG. 12 is a conceptual block diagram illustrating an example of a computing device useful for embodiments of the present disclosure.

FIG. 12 is a conceptual block diagram illustrating an example of a computing device 1200 useful for embodiments of the present disclosure. The computing device 1200 may include one or more processors 1202, coupled to other components of the computing device 1200 through a bus 1204. It should be understood that communication means other than busses can be utilized with the disclosed configurations. The computing device 1200 includes an interface 1216, which may be any type of interface and may reside between any of the components shown in FIG. 12. An interface 1216 may also be, for example, an interface to the outside world (e.g., an Internet network interface). In an aspect, the interface 1216 may an interface to the polarimeter of FIG. 2.

The one or more processors 1202 may include a general-purpose processor or a specific-purpose processor for executing instructions and may include a machine-readable medium 1219, such as a volatile or non-volatile memory, for storing data and/or instructions for software programs. The instructions, which may be stored in a machine-readable medium 1210 and/or 1219, may include an algorithm that can generate a dehazed image based on the Stokes values received from the polarimeter of FIG. 2. The instructions may be executed by the processor 1202. The processor 1202 may communicate with and control and manage access to the various networks, as well as provide other communication and processing functions. The instructions may also include instructions executed by the processor 1202 for various user interface devices, such as a display 1212 and a keypad 1214. The processor 1202 may include an input port 1222 and an output port 1224. Each of the input port 1222 and the output port 1224 may include one or more ports. The input port 1222 and the output port 1224 may be the same port (e.g., a bi-directional port) or may be different ports.

The processor 1202 may be implemented using software, hardware, or a combination of both. By way of example, the processing system 102 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 1219) may include storage integrated into a processing system, such as might be the case with an application specific integrated circuit (ASIC). Machine-readable media (e.g., 1210) may also include storage external to a processing system, such as a random access memory (RAM), a flash memory, a read only memory (ROM), a programmable read-only memory (PROM), an erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processor 1202. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. In one aspect, a machine-readable medium is a non-transitory machine-readable medium, a machine-readable storage medium, or a non-transitory machine-readable storage medium. In one aspect, a computer-readable medium is a non-transitory computer-readable medium, a computer-readable storage medium, or a non-transitory computer-readable storage medium. A non-transitory machine-readable medium (or a non-transitory computer-readable medium) may include, for example, one or more volatile memories and/or one or more non-volatile memories. Instructions may be executable, for example, by a client device, a server, a remote machine, or by a processing system of a client device, a server, or a remote machine. Instructions can be, for example, a computer program including code.

In some aspects, the computing device 1200 may include a transceiver block 1207, which may represent one or more transceivers, and each transceiver may include a receiver 1206 and a transmitter 1209. The processor 1202 is capable of communication with a receiver 1206 and a transmitter 1208 through the bus 1204 or other structures or devices. The processor 1202 can generate audio, video, multimedia, and/or other types of data to be provided to the transmitter 1209 for communication. In addition, audio, video, multimedia, and/or other types of data can be received at the receiver 1206, and processed by the processor 1202.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. For example, instead of using a tunable laser or heating laser, some aspects may use another electromagnetic source such as an electromagnetic source capable of tuning frequency that possesses a relatively narrow spectral bandwidth. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for removing haze from an input image, the system comprising:
   a polarimeter configured to:
      receive an input image, the input image comprising haze corresponding to light scatter, and
      produce plural Stokes values based on received input image; and
   a signal processor coupled to the polarimeter, the signal processor configured to:
      determine a peak angle and a valley angle for the input image based on the plural Stokes values, the peak angle corresponding to an angle at which the input image has the most amount of light scatter passing therethrough, and the valley angle corresponding to an angle at which the input image has the least amount of light scatter passing therethrough, and
      perform removal of the haze from the input image based on the determined peak and valley angles.

2. The system of claim 1, wherein the polarimeter is configured to produce the plural Stokes values in realtime.

3. The system of claim 1, wherein the signal processor is further configured to receive the plural Stokes values from the polarimeter.

4. The system of claim 1, wherein the plural Stokes values comprise first, second and third Stokes values.

5. The system of claim 4, wherein the determining the peak angle, $\theta_{peak}$, is based on the formulas:

$$\theta_{peak} = -\frac{1}{2}\tan^{-1}\left(-\frac{s_2}{s_1}\right) \text{ for } s_1 \geq 0; \text{ and}$$

$$\theta_{peak} = \frac{\pi}{2} - \frac{1}{2}\tan^{-1}\left(-\frac{s_2}{s_1}\right) \text{ for } s_1 < 0,$$

wherein $s_1$ and $s_2$ correspond to the second and third Stokes values, respectively.

6. The system of claim 5, wherein the determining the valley angle, $\theta_{valley}$, is based on the formula:

$$\theta_{valley} = \theta_{peak} + \frac{\pi}{2}.$$

7. The system of claim 1, wherein the determining the peak angle and the valley angle is based on a rotated polarizer Mueller matrix.

8. The system of claim 1, wherein the determining the peak angle and the valley angle comprises:
   multiplying the plural Stokes values by the rotated polarizer Mueller matrix in software, to generate plural airlight intensity values;
   plotting a graph of the plural airlight intensity values against respective polarizer angles corresponding to the rotated polarizer Mueller matrix; and
   selecting the peak angle and the valley angle based on the plotted graph.

9. The system of claim 1, wherein performing removal of the haze is based on the formula:

$$\tilde{r} = \frac{\tilde{i} - (\tilde{i}^\perp - \tilde{i}^\parallel)/\tilde{p}}{1 - (\tilde{i}^\perp - \tilde{i}^\parallel)/\tilde{p}\tilde{a}_\infty},$$

wherein $\tilde{i}$ represents the input image with haze,
wherein $\tilde{r}$ represents the input image with removal of the haze,
wherein $\tilde{i}^\perp$ represents a version of the input image at the peak angle,
wherein $\tilde{i}^\parallel$ represents an input image corresponding to the valley angle,
wherein $\tilde{p}$ represents a degree of linear polarization of the airlight, and
wherein $\tilde{a}_\infty$ represents an amount of airlight from an object at an infinite distance with no transmittance.

10. The system of claim 9, wherein $\tilde{p}$ is increased by a present factor for the calculation of $\tilde{r}$.

11. The system of claim 9, wherein $\tilde{a}_\infty$ is increased by a present factor for the calculation of $\tilde{r}$.

12. A method for removing haze from an input image, the method comprising:
   receiving plural Stokes values produced by a polarimeter based on an input image, the input image comprising haze corresponding to light scatter;
   determining a peak angle and a valley angle for the input image based on the plural Stokes values, the peak angle corresponding to an angle at which the input image has the most amount of light scatter passing therethrough, and the valley angle corresponding to an angle at which the input image has the least amount of light scatter passing therethrough; and
   performing removal of the haze from the input image based on the determined peak and valley angles.

13. The method of claim 12, wherein the polarimeter is configured to receive the input image and to produce plural Stokes values based on received input image.

14. The method of claim 12, wherein the polarimeter is configured to produce the plural Stokes values in realtime.

15. The method of claim 12, wherein the plural Stokes values comprise first, second and third Stokes values.

16. The method of claim 15, wherein the determining the peak angle, $\theta_{peak}$, is based on the formulas:

$$\theta_{peak} = -\frac{1}{2}\tan^{-1}\left(-\frac{s_2}{s_1}\right) \text{ for } s_1 \geq 0; \text{ and}$$

$$\theta_{peak} = \frac{\pi}{2} - \frac{1}{2}\tan^{-1}\left(-\frac{s_2}{s_1}\right) \text{ for } s_1 < 0,$$

wherein $s_1$ and $s_2$ correspond to the second and third Stokes values, respectively.

17. The method of claim 16, wherein the determining the valley angle, $\theta_{valley}$, is based on the formula:

$$\theta_{valley} = \theta_{peak} + \frac{\pi}{2}.$$

18. The method of claim 12, wherein the determining the peak angle and the valley angle is based on a rotated polarizer Mueller matrix.

19. The method of claim 12, wherein the determining the peak angle and the valley angle comprises:
   multiplying the plural Stokes values by the rotated polarizer Mueller matrix in software, to generate plural airlight intensity values;
   plotting a graph of the plural airlight intensity values against respective polarizer angles corresponding to the rotated polarizer Mueller matrix; and
   selecting the peak angle and the valley angle based on the plotted graph.

20. The method of claim 12, wherein performing removal of the haze is based on the formula:

$$\tilde{r} = \frac{\tilde{i} - (\tilde{i}^\perp - \tilde{i}^\parallel)/\tilde{p}}{1 - (\tilde{i}^\perp - \tilde{i}^\parallel)/\tilde{p}\tilde{a}_\infty},$$

wherein $\tilde{i}$ represents the input image with haze,
wherein $\tilde{r}$ represents the input image with removal of the haze,
wherein $\tilde{i}^\perp$ represents a version of the input image at the peak angle,
wherein $\tilde{i}^\parallel$ represents an input image corresponding to the valley angle,
wherein $\tilde{p}$ represents a degree of linear polarization of the airlight, and
wherein $\tilde{a}_\infty$ represents an amount of airlight from an object at an infinite distance with no transmittance.

* * * * *